Figure 1:
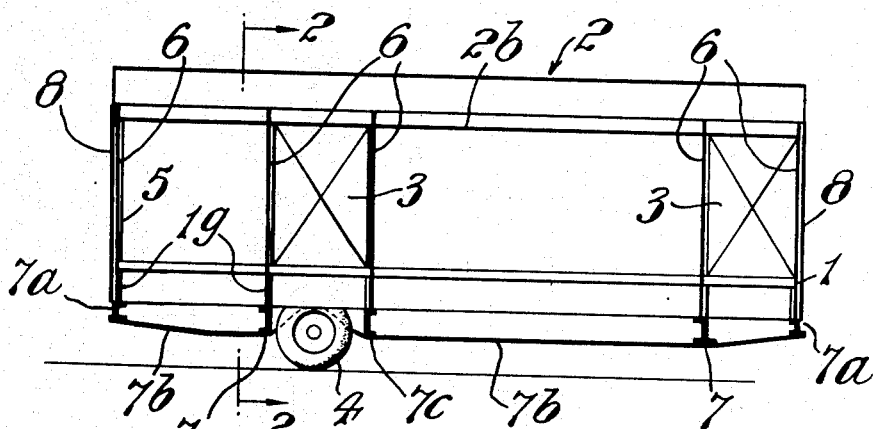

May 11, 1954     A. J. ENSOR     2,678,442
VEHICLE CABIN CONSTRUCTION

Filed Nov. 28, 1951.     5 Sheets-Sheet 1

INVENTOR
ARTHUR JOHN ENSOR
BY
ATTY

May 11, 1954 A. J. ENSOR 2,678,442
VEHICLE CABIN CONSTRUCTION
Filed Nov. 28, 1951 5 Sheets-Sheet 3
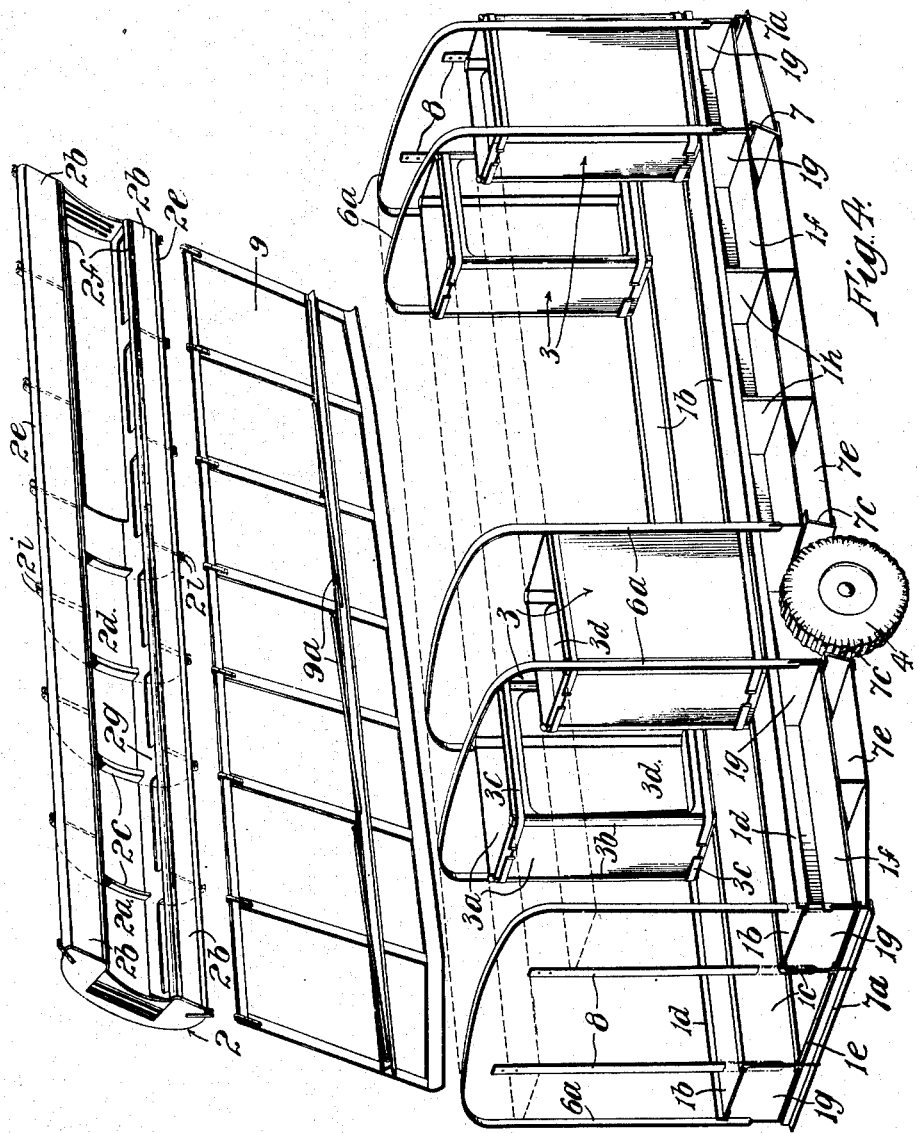
Fig. 4.
INVENTOR
ARTHUR JOHN ENSOR
BY 
ATTY

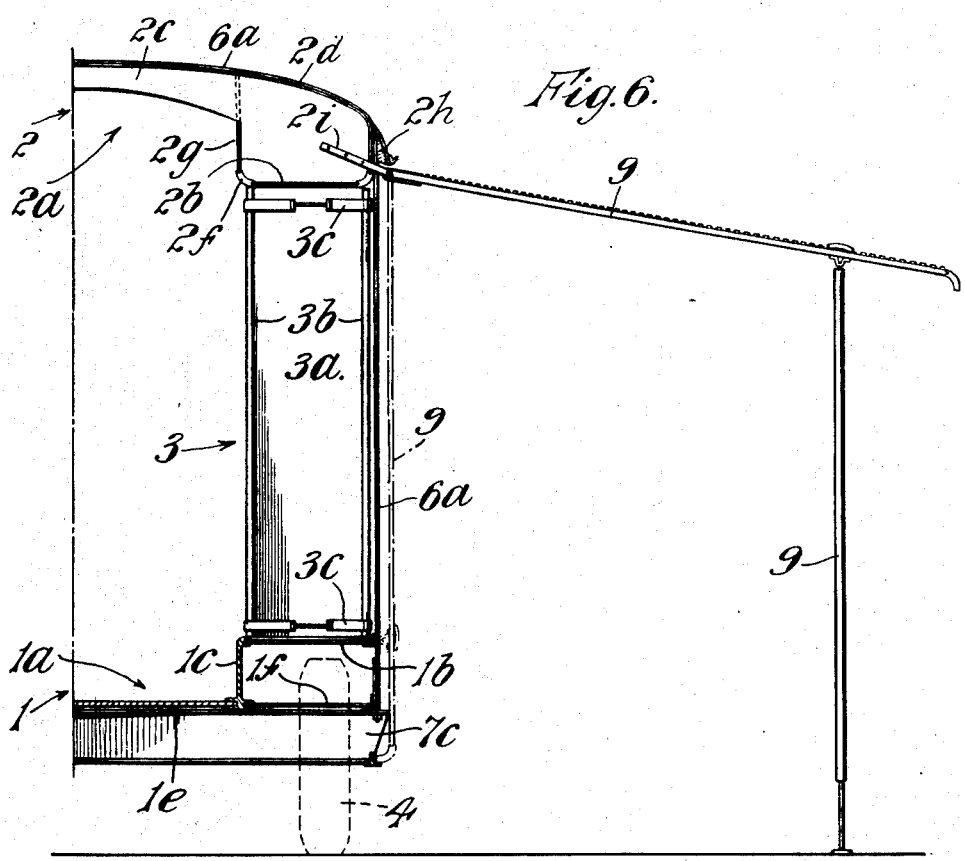

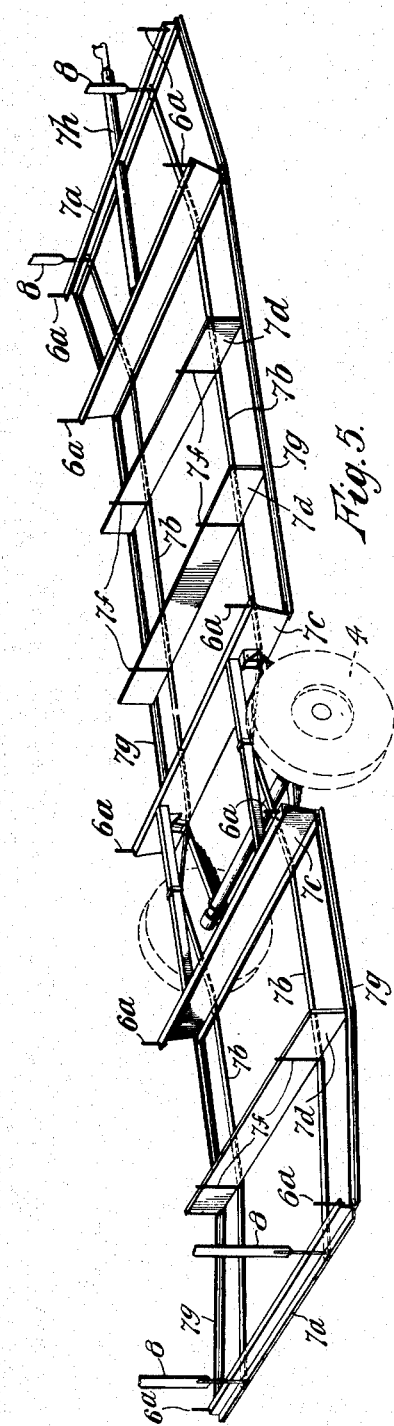

Patented May 11, 1954

2,678,442

UNITED STATES PATENT OFFICE 2,678,442

VEHICLE CABIN CONSTRUCTION

Arthur John Ensor, Bramley, England

Application November 28, 1951, Serial No. 258,574

7 Claims. (Cl. 296—23)

This invention is concerned with an improved construction of cabin particularly suitable for caravan trailers.

A major object of the invention is to provide a basic cabin structure which constitutes in itself a rigid section not needing a separate chassis and therefore particularly suitable for adaptation as an amphibious vehicle, related objects being constructional simplicity and economy of material, and easy dismantling and collapsibility to greatly reduced bulk if required.

According to the invention the cabin essentially comprises longitudinally extending floor and roof components with spacers between them and is held assembled by ties interconnecting the said components and acting in opposition to the said spacers.

The seating of these spacers in combination against the components may be relied on to provide the required structural stability, under the influence of the associated ties, both longitudinally and laterally of the cabin, as by making the spacers at least in part box-like to form one or more piers or columns between the components.

The effective length of the ties may be made capable of adjustment, as by screw means, so that they can be tightened, and it is desirable for the ties and spacers to be arranged closely adjacent one another in order that the spacers may oppose the ties and such tightening thereof most effectively.

The ties may form part of a series of transverse binding rings around the assembled structure, each ring preferably including a rigid cross-member under the floor component, to which cross-members the ties may be adjustably and detachably secured. The remainder of each ring may take the form of an arched loop of flexible metal band or strap over the roof component.

The cabin is preferably adapted to be dismantled, for which purpose the spacers may be removable and the ties may be separable or detachable to permit collapsing of the roof component down onto the floor component.

Where the floor and roof components are of opposed U-section with outwardly extending flanges, forming for example in the case of the floor component, side platforms with a gangway channel between them, and in the case of the roof component, side shelves on either side of a head room, the spacers may be seated between these flanges of the respective components on both sides thereof to form a closed structural section which, when collapsed vertically by removal of the spacers, still leaves room for the accommodation of the latter between the components.

The invention will now be described as embodied in the caravan trailer shown in the accompanying drawings, whereof:

Figures 1, 2, 3A, 3B and 3C are simplified views for the purpose of illustrating the basic principles of the invention.

Figure 2:
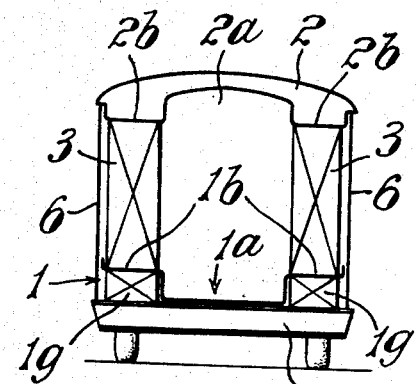
Figure 3:
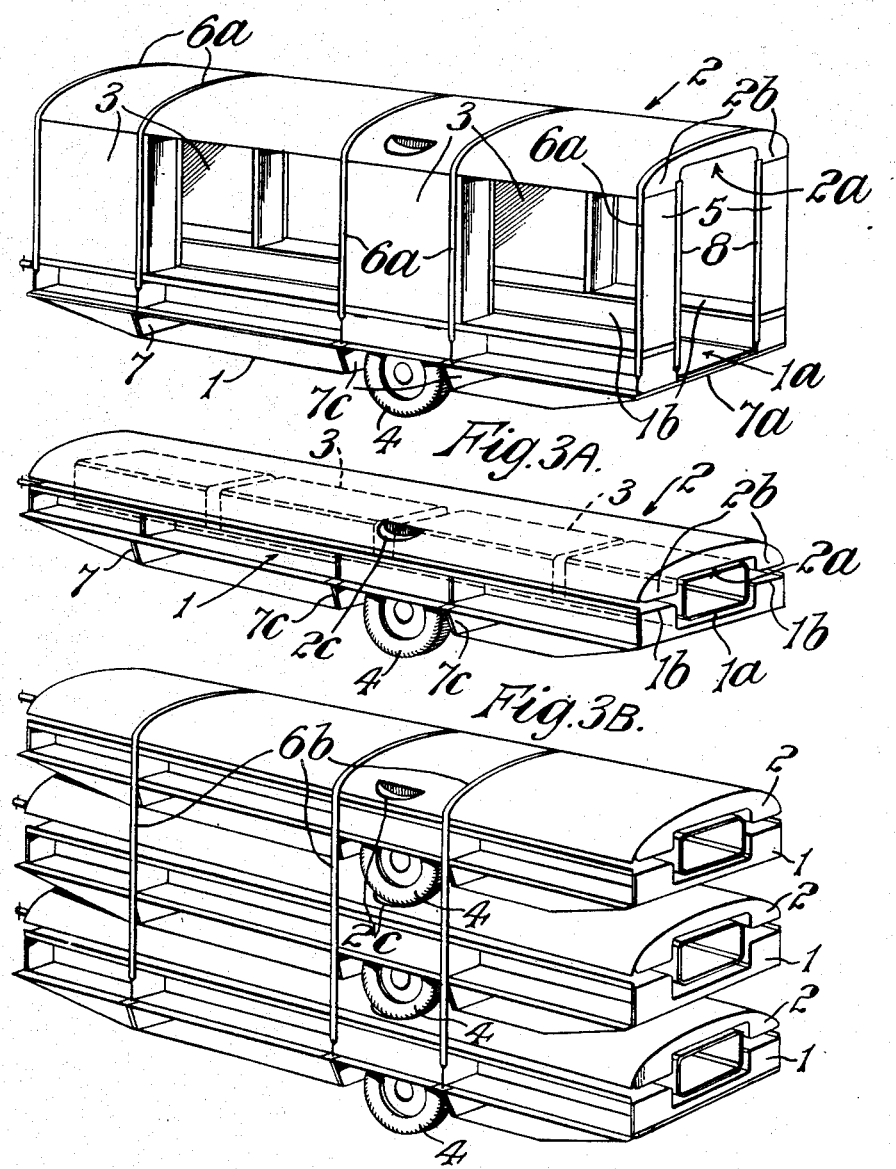

Figure 1 being a side elevation of the trailer and Figure 2 a cross-section along the line 2—2 of Figure 1, these two views showing tie rods at the side of the cabin for holding together the main floor and roof components; and Figures 3A, 3B and 3C being perspective views of a slightly modified constructional form with arched loops of tie band or strap extending over the roof component in place of the tie rods, Figure 3A showing such a trailer expanded, Figure 3B showing it collapsed and Figure 3C showing three complete trailers in collapsed condition superimposed, e. g. for shipment;

Figures 4, 5 and 6 are more detailed views to a larger scale of the trailer shown in Figure 3A including cover shields hinged to the roof component to form side walls to the cabin when the shields are lowered and lateral roof extensions when they are raised, Figure 4 being an exploded perspective view with the roof component and far side cover shield separated from the lower structure, parts omitted or broken for clarity of illustration and the assembled position of the roof component indicated in pecked lines, Figure 5 showing the underframe and road wheel mounting independently in similar perspective to the lower structure in Figure 4, and Figure 6 being a half cross-section of the assembled cabin of Figures 4 and 5 with the extended cover shield shown in full line and its lowered position shown chain dotted.

The longitudinally extending floor component (denoted generally by the reference 1) serves as a main backbone girder, and provides a central gangway channel 1a between raised platforms 1b extending out as broad lateral flanges on either side thereof.

Similarly the longitudinally extending roof component (denoted generally by the reference 2) of corresponding but inverted section to the floor component, provides the head room 2a over the gangway channel between the under faces 2b of side shelves or the like immediately above the platforms.

The roof component is supported from the floor component on the box-like spacers 3 arranged in pairs on the platforms 1b with the faces 2b of the roof component resting on top of them, the spacers being of equal or comparable width with the said platforms 1b and faces 2b and also sufficiently extended lengthwise of the cabin to form piers or columns of adequate horizontal section and vertically rigid enough both laterally and longitudinally to provide stable seatings for the roof component.

It is desirable for one pair of these spacers 3 to be disposed as shown directly above the road wheels 4 or above each pair of such wheels. Apart from this, the provision of one or more further pairs of such spacers and the arrangement thereof is determined by the length of the cabin or may be a matter of choice. In the case of the illustrated single-axle trailer a second pair of similar box-like spacers is preferred at the forward end of the cabin, but the pair of plain cross panels 5 is thought to provide adequate laterally rigid support between the trailing ends of the platforms 1b and faces 2b.

The parts of the cabin are normally held assembled by means of the vertical ties 6 at the sides thereof, the effective length of which ties is made adjustable as by screw means so that they can be tightened against the resistance offered by the spacers, the ties also preferably being separable or detachable to facilitate dismantling of the cabin.

These ties may be in the form of rods, the top ends of which are removably screwed into the roof component beneath the eaves thereof. The bottom ends of the tie rods are engaged with the floor component through the rigid cross-members 7 arranged transversely under the latter, being secured by nuts to the laterally projecting extremities of these cross-members permitting detachment therefrom as well as the required tightening of the ties.

The tie rods 6 may be replaced as shown in Figure 3A by the arched loops 6a of tie band or strap passing over the roof component and similarly attached adjustably and detachably at both ends to the cross-members 7.

In order that the spacers may effectively oppose the tightening of the ties without distortion of the floor and roof components, it is preferable for the said spacers and ties to be arranged closely adjacent one another. Thus, ties 6 or 6a are coplanar with both ends of each of the pairs of box-like spacers 3 and just a single tie coplanar with the cross-panel spacers 5.

The closed structural section (see Figure 2) comprising the floor and roof components in combination with the spacers between them on either side of the central gangway, is thus held together externally by a series of transverse binding rings which may be made up in part of the said components, if sufficiently rigid, or of either of them, in which connection, members 7 may be regarded as part either of the binding rings or of the floor component, and the roof component, when tie rods are secured to it as in the Figures 1 and 2 arrangement, as part of the rings. Although the ties are thought to be most effectively disposed thus externally of the cabin section, they can alternatively be arranged in line with, e. g. within the spacers or even on the near side thereof.

Additional adjustable and detachable ties 8 may be provided on either side of the gangway at the ends of the cabin between the roof component and the two outermost 7a of the cross-members 7 to which the ends of the longitudinal bands or straps 7b, whereby the underframe is braced in a manner described below, are also attached, the ties 8 being preferably in line with these straps to form, in conjunction therewith and with the roof component, two longitudinal binding rings.

The cabin may be dismantled by just loosening and preferably removing the ties and then removing the spacers to collapse the roof component down onto the floor component and thus contract the closed structural section vertically, as shown in Figure 3B. If gangway channel 1a and platforms 1b of the floor component are of substantially the same width respectively as head room 2a and faces 2b of the roof component, the said platforms and faces are thus brought together and the said channel and head room into register to form a longitudinal passage adapted to accommodate the spacers. To this end the relative proportioning of the said components and spacers may be such that the depth of this passage, i. e. the combined depths of the channel and head room, is sufficient to take the width of the spacers lying horizontally as shown with their normally lengthwise dimension across the width of the said passage, i. e. the width of the channel and head room. Furthermore, the floor and roof components, and consequently the passage also, should preferably be at least as long as the spacers together end to end.

Arched loops 6b, differing only in length as may be necessary from loops 6a and anchored in the same way, may be used for holding one or more collapsed trailers superimposed as shown in Figure 3C, for which purpose the roof components may be recessed at 2c to take the road wheels 4 of a trailer supported thereon.

The following further description refers to the extra detail shown more particularly in Figures 4 to 6.

Dealing firstly with the floor component as shown in these figures, it will be observed that the gangway channel side walls are formed of two main rigid longitudinals 1c which are grooved externally along their top edges to receive panels forming the platforms 1b extending up to rigid outer edge angles 1d, and internally along their bottom edges to receive panel 1e forming the bottom of the channel. The longitudinals 1c are also grooved along their bottom edges externally to receive the bottom panels 1f of lockers beneath the platforms accessible from outside the cabin. The side walls of these lockers are formed by the cross-panels 1g whereby those parts of the platforms in the planes of the transverse binding rings are reinforced to provide an adequately rigid support for the spacers 3 and 5. Further division panels 1h may also be provided beneath the platforms and similarly used as structural reinforcements, if required.

The underframe (the construction of which appears most clearly in Figure 5), comprises one of the rigid cross-members 7 in each transverse binding ring, of which members an adjacent pair 7c forms an enclosure and mounting for the road wheels and their axle and springs as shown. Other cross divisions 7d of the underframe may form in conjunction with bottom panels 7e (included in Figure 4 but omitted from Figure 5), through locker spaces beneath the floor component. The whole underframe is braced together by the longitudinal bands or straps 7b attached between the end cross-members 7a and supported at intervals by pins 7f from the main longitudinals 1c of the floor component. The underframe is completed by the side edge T-section members 1g (included in Figure 5 but omitted from Figure 4) and tow bar 7h.

Next for fuller consideration are the box-like spacers 3, each formed by binding together four panels 3a engaged in grooved rigid edge uprights 3b by means of top and bottom straps 3c, to form prismatic piers or columns whose open top and bottom ends are of sufficiently large cross-section to provide seatings against the floor and roof components capable of ensuring satisfactory stability both longitudinally and laterally of the cabin when the parts are held together by the associated ties 6a. One or more of the panels 3a may be pierced with an opening 3d to form the spacer into a closet or the like. If desired the ends of spacers 3 may be definitely located by means of seating frames (not shown) on the platforms 1b and faces 2b.

A satisfactory construction of the roof component is shown in Figures 4 and 6, from which it will be seen to be built up about a series of longitudinally spaced rigid transverse arched stiffeners 2c, of which there should be one in the plane of each of the transverse binding rings. A suitable curved outer panel 2d is laid over these arched stiffeners between rigid grooved edge members 2e at the eaves. Inwardly from these members extend horizontal shelf panels engaged thereby, which panels form the aforementioned faces 2b on which the roof component is supported. These shelf panels are also engaged by the inner rigid grooved edge members 2f on either side of the head room 2a, which members are rigidly backed by the vertical panels 2g from the stiffeners 2c. The tie loop arches 6a may emerge to embrace the roof component from behind its gutter fillets 2h, below which each loop passes between the straps 2i of one of the projecting pairs of such straps provided at both ends of each of the stiffeners 2c to form hinge knuckles for the cover shields 9, the construction of which and their manner of raising as roof extensions supported on struts 9a and of lowering against the cabin to form side walls thereof, are clear from the drawings.

The rigid grooved longitudinal members such as 1c, 2e and 2f may be extruded light metal sections and the panels engaged thereby of plywood or similar sheet material. It will be clear how the transverse binding rings comprising the cross-members 7 and arched loops 6a act to brace these elements of the floor and roof components respectively together, besides holding the structure assembled as a whole. However, the similarly constructed spacers 3, on account of their vertical arrangement, require independent horizontal binding rings 3c of their own.

What I claim is:

1. A collapsible cabin construction comprising a plurality of supporting elements arranged crosswise of said cabin and in relatively spaced coplanar relation, a floor component resting upon and being secured to said supporting elements, said floor component being provided with a pair of elongated upwardly protruding side platform sections arranged in spaced substantially parallel relation and disposed lengthwise of said floor component to form an elongated central gangway, a plurality of hollow columnar spacer members detachably mounted on and extending upright from said platform sections, a roof component resting upon said upright spacer members and in substantially superimposed relation with said floor component, when said cabin is in assembled relation, and resting directly upon said platform sections and spanning said central gangway, when said cabin is in a collapsed relation, to form an elongated storage compartment for accommodating said detached spacer members, and tie means removably mounted on said supporting elements and extending upright therefrom for engaging said roof component to effect clamping of said spacer members in upright positions intermediate said roof component and said platform sections, when said cabin is in assembled relation.

2. A collapsible cabin construction comprising a plurality of supporting elements arranged crosswise of said cabin and in relatively spaced coplanar relation, a floor component resting upon and being secured to said supporting elements, said floor component being provided with a pair of elongated upwardly protruding side platform sections arranged in spaced substantially parallel relation and disposed lengthwise of said floor component to form an elongated central gangway extending the full length of and at least one-half the width of said floor component, a plurality of hollow columnar spacer members detachably mounted on and extending upright from said platform sections, a roof component resting upon said upright spacer members and in substantially superimposed relation with said floor component, when said cabin is in assembled relation, and resting directly upon said side platform sections and spanning said central gangway, when said cabin is in collapsed relation, to form an elongated storage compartment for accommodating said detached spacer members, and tie means removably mounted on said supporting elements and extending upright therefrom for engaging said roof component to effect clamping of said spacer members in upright position intermediate said roof component and said platform sections, when said cabin is in assembled relation.

3. A collapsible vehicle cabin construction comprising a plurality of supporting elements arranged crosswise of said cabin and in relatively spaced coplanar relation, a floor component resting upon and being secured to said supporting elements, said floor component being provided with a pair of elongated upwardly protruding side platform sections arranged in spaced substantially parallel relation and disposed lengthwise of said floor component to form an elongated central gangway extending the full length of and at least one-half the width of said floor component, a plurality of hollow columnar spacer members detachably mounted on and extending upright from said platform sections, a roof component resting upon said upright spacer members and in substantially superimposed relation with said floor component, when said cabin is in assembled relation, said roof component being provided with a pair of elongated depending side shoulder sections which are disposed in coextensive relation with said side platform sections, when said cabin is in assembled relation, and in direct contact therewith, when said cabin is in collapsed relation, and having the center portion of said roof component intermediate said side shoulder sections overlying said central gangway to form an elongated storage compartment for accommodating said detached spacer members, and tie means removably mounted on said supporting elements and extending upwardly therefrom and overlying said roof component to effect clamping of said spacer members in upright positions intermediate said side shoulder sections and said side platform sections, when said cabin is in assembled relation.

4. A cabin structure of the kind described comprising an assembly of elongated floor and roof components and at least one box-like spacer column at each side interposed therebetween, each of said box-like spacers having a transverse dimension of the order of one-fourth of the width of said cabin, rigid cross members beneath the floor component, and binding rings for holding said floor, roof and spacer components in assembled relationship on said cross members, each of said rings including a pair of ties, one at each side of the cabin, said ties interconnecting the roof component with said cross-members in opposition to said spacer members.

5. A cabin structure of the kind described comprising an elongated assembly of floor and roof components, each of U-channel section including outwardly extending flanges at each side thereof, the transverse dimension of each of said flanges being of the same order as one-fourth of the transverse dimension of said cabin, and hollow spacer members at each side interposed between the floor and roof components and seated on said flanges, said spacers having a transverse dimension substantially equal to the transverse dimensions of the associated flange, rigid cross-members beneath the floor component extending to the free edges of the flanges, said floor component resting on said cross members, stiffening means carried by the cross-members and supportingly engaging said flange members, and binding rings for holding said assembly together, each of said rings including one of said cross members and a pair of ties, one at each side of the cabin, said ties interconnecting the roof component with said one cross-member in opposition to the spacer members to apply compressive force thereto.

6. A cabin structure of the kind described comprising an elongated assembly of floor and roof components, each of U-channel section including outwardly extending flanges at each side thereof, and hollow spacer members at each side interposed between the floor and roof components and seated on said flanges, said spacers having a transverse dimension substantially equal to the transverse dimension of the associated flange to form a cabinet, said cabinet having access means formed therein, rigid cross-members beneath the floor component extending to the free edges of said flanges, said floor component resting on said cross-members, stiffening means carried by the cross-members and supportingly engaging said flange members, and binding rings for holding said assembly together, each of said rings including one of said cross members and a pair of ties, one at each side of the cabin, said ties interconnecting the roof component with said one cross-member in opposition to the spacer members to apply compressive force thereto.

7. A cabin structure of the kind described comprising an elongated assembly of floor and roof components, each of U-channel section including outwardly extending flanges at each side thereof, and hollow spacer members at each side interposed between the floor and roof components and seated on said flanges, said spacer member being substantially rectangular in cross-section and having a transverse dimension substantially equal to the transverse dimension of said flanges and a longitudinal dimension substantially equal to the transverse distance between said flanges whereby said spacers are receivable within said channels to form a collapsed structure, rigid cross-members beneath the floor component extending to the free edges of said flanges, said floor component resting on said cross-members, means carried by the cross-members and supportingly engaging said flange members, and binding rings for holding said assembly together, each of said rings incuding one of said cross members and a pair of ties, one at each side of the cabin, said ties interconnecting the roof component with said one cross-member in opposition to the spacer members to apply compressive force thereto.

References Cited in the file of this patent
UNITED STATES PATENTS

| Number | Name | Date |
|---|---|---|
| 717,903 | North | Jan. 6, 1903 |
| 2,197,644 | Krogh | Apr. 16, 1940 |
| 2,483,332 | Brumbaugh | Sept. 27, 1949 |
| 2,489,670 | Powell, Jr. | Nov. 29, 1949 |
| 2,551,207 | Ensor | May 1, 1951 |